United States Patent
Zierhofer

(10) Patent No.: US 8,975,941 B2
(45) Date of Patent: Mar. 10, 2015

(54) DATA AND POWER SYSTEM BASED ON CMOS BRIDGE

(71) Applicant: MED-EL Elektromedizinische Geraete GmbH, Innsbruck (AT)

(72) Inventor: Clemens M. Zierhofer, Kundl (AT)

(73) Assignee: MED-EL Elektromedizinische Geraete GmbH, Innsbruck (AT)

( * ) Notice: Subject to any disclaimer, the term of this patent is extended or adjusted under 35 U.S.C. 154(b) by 0 days.

(21) Appl. No.: 13/908,331

(22) Filed: Jun. 3, 2013

(65) Prior Publication Data

US 2013/0336034 A1     Dec. 19, 2013

Related U.S. Application Data

(60) Division of application No. 13/551,817, filed on Jul. 18, 2012, now Pat. No. 8,476,955, which is a continuation of application No. 12/399,533, filed on Mar. 6, 2009, now Pat. No. 8,248,141, which is a (Continued)

(51) Int. Cl.
   *H03L 5/00*     (2006.01)
   *H02M 7/00*     (2006.01)
   *H02M 7/219*    (2006.01)

(52) U.S. Cl.
   CPC ...... *H02M 7/219* (2013.01); *H02M 2007/2195* (2013.01); *Y02B 70/1408* (2013.01)
   USPC .......................................... 327/330; 363/125

(58) Field of Classification Search
   USPC ................... 327/330, 333, 306–307; 363/125
   See application file for complete search history.

(56) References Cited

U.S. PATENT DOCUMENTS

| 3,054,939 A | 9/1962 | Thompson ...................... 321/16 |
| 4,355,287 A | 10/1982 | Hoover .......................... 330/264 |

(Continued)

FOREIGN PATENT DOCUMENTS

| EP | 1145733 | 4/2001 | ............... A61N 1/36 |
| WO | WO 2007/072226 | 6/2007 | |

OTHER PUBLICATIONS

Ghovanloo et al., "12.5—Modular 32-Site Wireless Neural Stimulation Microsystem," *International Solid-State Circuits Conference*, 2004 Session 12—Biomicrosystems, pp. 226-235, Feb. 17, 2004.

(Continued)

*Primary Examiner* — Dinh Le
(74) *Attorney, Agent, or Firm* — Sunstein Kann Murphy & Timbers LLP

(57) ABSTRACT

A signal processing circuit includes an input inverter and an output inverter. Each inverter has a signal input for receiving an input rectangular signal, a signal output for providing an inverted output rectangular signal, and a pair of voltage outputs for developing a rectified dc output voltage. A first circuit input terminal is connected to the output of the input inverter and the input of the output inverter. A second circuit input terminal is connected to the input of the input inverter and the output of the output inverter, wherein the signal input terminals receive an input signal having a data component. A pair of supply voltage output terminals is connected to the voltage output terminals of the inverters for providing a rectified dc supply voltage output. A first circuit output terminal is connected to one of the supply voltage output terminals, and a second circuit output terminal connected to the second circuit input terminal, wherein the circuit output terminals provide an output signal including the data component.

25 Claims, 8 Drawing Sheets

Related U.S. Application Data continuation-in-part of application No. 11/482,547, filed on Jul. 7, 2006, now abandoned.

(60) Provisional application No. 60/697,624, filed on Jul. 8, 2005.

(56) References Cited

U.S. PATENT DOCUMENTS

| | | | |
|---|---|---|---|
| 4,473,757 A | 9/1984 | Farago et al. | 307/127 |
| 4,533,988 A | 8/1985 | Daly et al. | 363/127 |
| 4,535,203 A | 8/1985 | Jenkins et al. | 179/81 R |
| 5,173,849 A | 12/1992 | Brooks | 363/127 |
| 5,178,140 A | 1/1993 | Ibrahim | 128/419 D |
| 5,559,507 A | 9/1996 | Beigel | 340/825.54 |
| 5,622,886 A | 4/1997 | Allum et al. | 438/238 |
| 5,870,031 A | 2/1999 | Kaiser et al. | 340/825.54 |
| 5,870,038 A | 2/1999 | Tomita et al. | 341/61 |
| 5,935,155 A | 8/1999 | Humayun et al. | 607/54 |
| 6,078,512 A | 6/2000 | Bouvier | 363/127 |
| 6,088,608 A | 7/2000 | Schulman et al. | 600/345 |
| 6,181,588 B1 | 1/2001 | Kates et al. | 363/126 |
| 6,404,268 B1 | 6/2002 | Hung et al. | 327/531 |
| 6,750,560 B1 | 6/2004 | Nishimoto et al. | 307/1 |
| 7,167,090 B1 | 1/2007 | Mandal et al. | 340/538.14 |
| 8,060,040 B2 | 11/2011 | Arnborg | 455/130 |
| 8,248,141 B2 | 8/2012 | Zierhofer | 327/330 |
| 8,254,152 B2 | 8/2012 | Wang et al. | 363/127 |
| 8,285,394 B1 * | 10/2012 | Wessendorf et al. | 607/116 |
| 8,415,837 B2 * | 4/2013 | Theilmann et al. | 307/149 |
| 8,476,955 B2 | 7/2013 | Zierhofer | 327/330 |
| 2002/0003168 A1 | 1/2002 | Takabayashi | 235/492 |
| 2002/0042561 A1 | 4/2002 | Schulman et al. | 600/345 |
| 2007/0121355 A1 | 5/2007 | Zierhofer | 363/125 |
| 2008/0177353 A1 | 7/2008 | Hirota et al. | 607/57 |

OTHER PUBLICATIONS

International Searching Authority, International Search Report—International Application No. PCT/IB2006/004050 dated Aug. 29, 2007, together with the Written Opinion of the International Searching Authority, 17 pages.

International Searching Authority, International Search Report—International Application No. PCT/US09/36342 dated Jan. 11, 2010, together with the Written Opinion of the International Searching Authority, 9 pages.

Sauer et al., "Power Harvesting and Telemetry in CMOS for Implanted Devices," *Proc. IEEE Int. workshop Biomedical Circuits and Systems (BioCAS'2004)*, Singapore, Dec. 1-3, 2004.

Theta Engineering Incorporated, "Rectifer Bridge Has No 2V *f* drop! The venerable full-wave rectifier bridge (Fig. 1) is a common, familiar circuit for converting an AC input voltage to a DC output voltage. It is also useful for transplanting a DC input of arbitrary polarity into a DC output of known polarity, as is commonly required in electronic telephones or other telephony devices, and has application in protecting against battery reversal in battery-powered circuits.", 4 pages, http://thetaeng.com/FETBridge.htm.

Zierhofer, U.S. Appl. No. 13/908,331, filed Jun. 3, 2013, Data and Power System Based on CMOS Bridge.

European Patent Office, Extended European Search Report—Application No. 09841252.1-1804 dated Feb. 17, 2014, 7 pages.

\* cited by examiner

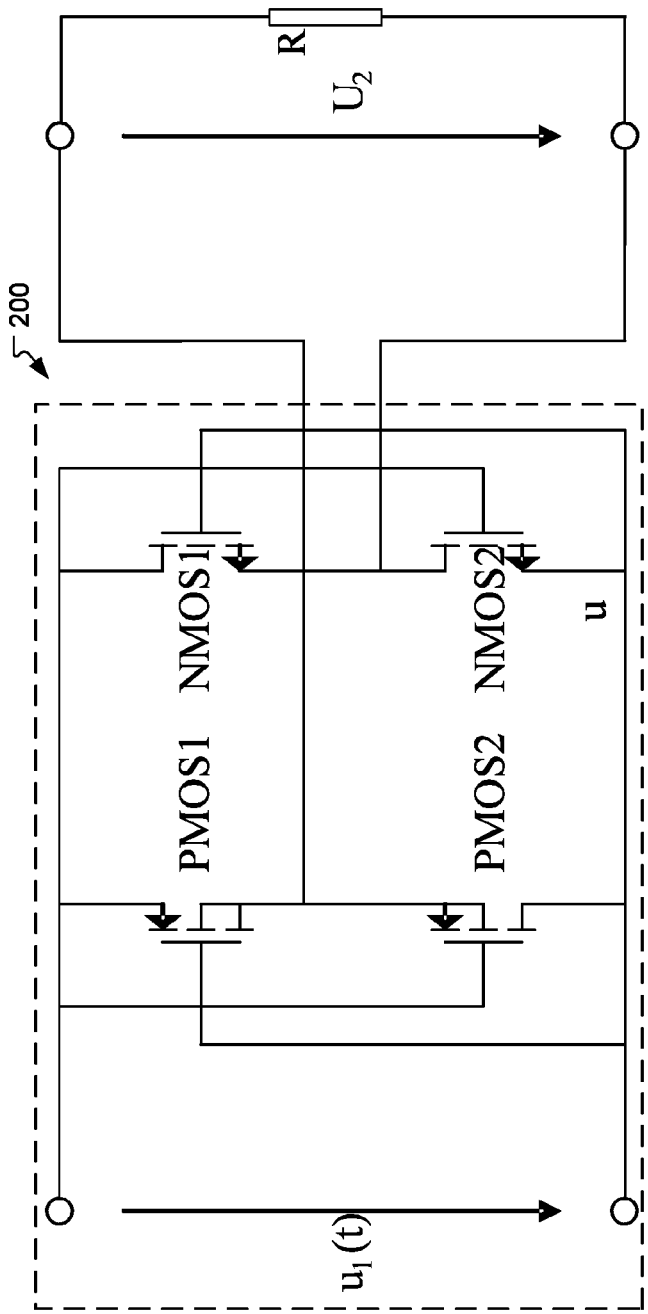
*Fig. 2(A)*
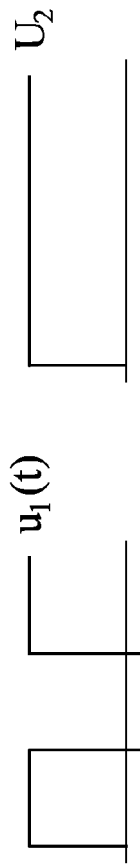
*Fig. 2(B)*
*Fig. 2(C)*

DATA AND POWER SYSTEM BASED ON CMOS BRIDGE

CROSS-REFERENCE TO RELATED APPLICATIONS

This application is a divisional of U.S. patent application Ser. No. 13/551,817, filed Jul. 18, 2012, which in turn is a continuation of U.S. patent application Ser. No. 12/399,533, filed Mar. 6, 2009, which in turn is a continuation in part of U.S. patent application Ser. No. 11/482,547, filed Jul. 7, 2006, which claims priority from U.S. Provisional Patent Application 60/697,624, filed Jul. 8, 2005, the contents of which are incorporated herein by reference.

FIELD OF THE INVENTION

The present invention relates to a signal processing circuit, and more particularly, to a CMOS full-wave rectifier circuit that extract a data component signal.

BACKGROUND ART

Generally, rectifiers are used for the conversion of AC to DC voltage. A CMOS bridge circuit 100 that can be used in such a rectifier is shown in FIG. 1. The CMOS bridge circuit 100 can be regarded as a non-linear, two-port device having an input voltage $u_1(t)$ that receives the AC voltage, a output voltage $U_2$, and four CMOS switches PMOS1, PMOS2, NMOS1, and NMOS2. In general, the output port is connected to a load which may be a purely resistive load (full-wave rectifier), or a resistive load in parallel with a capacitive load (for DC voltage).

The gates of the CMOS switches may be directly connected to the input voltage terminals. Assuming a purely resistive load and an ideal switching performance of the transistors, the following conditions are fulfilled:

$$U_2 = |u_1(t)|, \text{ if } |u_1(t)| \geq u_{THR},$$

and $$U_2 = 0, \text{ if } |u_1(t)| < u_{THR},$$

whereby voltage $u_{THR}$ denotes a MOS-threshold voltage, which here is assumed to be equal for both, PMOS and NMOS transistors. For $u_1(t) \geq u_{THR}$, PMOS1 and NMOS2 are switched on (low impedance), whereas transistor PMOS2 and NMOS1 are switched off (high impedance), and vice versa for $u_1(t) \leq -u_{THR}$, transistors PMOS2 and NMOS1 are switched on, and transistors PMOS1 and NMOS2 are switched off. Thus, for the special case of an ohmic load, the CMOS-bridge 100 of FIG. 1 represents a full-wave rectifier. Note that here the full input voltage magnitude applies at the load and there is no reduction due to diode voltage drops. Typically, MOS threshold voltages are $u_{THR} \sim 0.7V$.

Assuming a sinusoidal input voltage, the bridge circuit 100 does not fully work as a rectifier for all types of loads because transistor switches operated in ON-states allow current flow in both directions (in contrast to a diode). For example, if the circuit load is a parallel resistor and capacitor then the capacitor is partly discharged by the transistors in switch-turn-on states. Assuming $u_1(t) > u_{THR}$, PMOS1 and NMOS2 are switched on, and voltage $U_2$ simply follows the input voltage $u_1(t)$. This means that the load capacitor is discharged not only via the load resistor, but also via the input lines. One way to address this is connect an output diode in series with the load resistor and output capacitor; however this may be unacceptable in low power applications due to the diode voltage drop.

Furthermore, when a constant DC voltage is desired, the addition of a smoothing capacitor and/or diode in conjunction with the bridge circuit may be impractical for applications that have limited space. For example, the sensing/stimulation element of a retinal implant is positioned directly within the eyeball, making space a primary concern.

SUMMARY OF THE INVENTION

In accordance with one embodiment of the invention a signal processing circuit includes an input inverter and an output inverter. Each inverter has a signal input for receiving an input rectangular signal, a signal output for providing an inverted output rectangular signal, and a pair of voltage outputs for developing a rectified dc output voltage. A first circuit input terminal is connected to the output of the input inverter and the input of the output inverter. A second circuit input terminal is connected to the input of the input inverter and the output of the output inverter, wherein the signal input terminals receive an input signal having a data component. A pair of supply voltage output terminals is connected to the voltage output terminals of the inverters for providing a rectified dc supply voltage output. A first circuit output terminal is connected to one of the supply voltage output terminals, and a second circuit output terminal connected to the second circuit input terminal, wherein the circuit output terminals provide an output signal including the data component.

In accordance with related embodiments of the invention, the signal processing circuit may further include a substantially resistive load (with the only output capacitance being, for example, relatively small parasitic capacitances from circuit components and leads) operatively coupled between the first and second voltage output terminals, the resistive load without a discrete parallel capacitor. The signal processing circuit may be integrated on a single chip. An implanted medical device, such as retinal implant or a cochlear implant may include the signal processing circuit. A chip may include the signal processing circuit, with a resistive load coupled between the first and second output terminals without a discrete parallel capacitor. The load may include a signal processor.

In accordance with another embodiment of the invention, a signal processing circuit includes a CMOS bridge rectifier circuit. The CMOS bridge rectifier circuit includes a first input terminal and a second input terminal for receiving a rectangular wave form that includes a data sequence. The CMOS bridge rectifier circuit further includes a first output terminal and a second output terminal for providing a rectified dc output voltage. A first data output terminal is connected to one of the first and the second input terminals, and a second data output terminal is connected to one of the first and the second output terminals, wherein the data output terminals provide an output signal representative of the data sequence.

In accordance with related embodiments of the invention, the signal processing circuit may further include a substantially resistive load (with the only output capacitance being, for example, relatively small parasitic capacitances from circuit components and leads) operatively coupled between the first and second voltage output terminals, the resistive load without a discrete parallel capacitor. The signal processing circuit may be integrated on a single chip. An implanted medical device, such as a retinal implant or a cochlear implant, may include the signal processing circuit. A chip may include the signal processing circuit, with a resistive load coupled between the first and second output terminals without a discrete parallel capacitor. The load may be a signal processor.

In accordance with another embodiment of the invention, a method of providing data and power in a medical implant is presented. The method includes applying a rectangular wave input signal between a first input terminal and a second input terminal. A first switch is coupled between the first input terminal and a first node. A second switch is coupled between the second input terminal and the first node. The first node is coupled to a first output terminal. A third switch is coupled between the first input terminal and a second node. A fourth switch is coupled between the second input terminal and the second node. The second node is coupled to a second output terminal. A third output terminal is coupled to the second input terminal, and a fourth output terminal coupled to the second node. The first switch and fourth switch are gated on when the input signal is of a first polarity; and the second switch and the third switch are gated on when the input signal is of a second polarity opposite the first polarity so that the first and second output terminals provide a dc voltage, and the third and fourth terminals provide a data component.

In accordance with related embodiments of the invention, the medical implant may be a cochlear implant or a retinal implant. A substantially resistive load (with the only output capacitance being, for example, relatively small parasitic capacitances from circuit components and leads) may be operatively coupled between the first and second output terminals, the resistive load without a discrete parallel capacitor. The first switch, the second switch, the third switch, and the fourth switch may be MOS transistors. The method may further include disconnecting the input signal from the input terminals for a period of time after the switches are gated on (e.g., after applying the rectangular wave). The rectangular wave input signal may be non-periodic.

In accordance with another embodiment of the invention, a rectangular wave form that includes a data sequence is applied across a first input terminal and a second input terminal of a CMOS bridge rectifier. The CMOS bridge rectifier includes a first output terminal and a second output terminal for providing a rectified dc output voltage. A first data output terminal is connected to the first or second input terminals, and a second data output terminal is connected to the first or second output terminals. The data output terminals provide an output signal representative of the data sequence.

In accordance with related embodiments of the invention, the CMOS bridge rectifier may include two inverters. The medical implant may be a cochlear implant or a retinal implant. A substantially resistive load (with the only output capacitance being, for example, relatively small parasitic capacitances from circuit components and leads) may be operatively coupled between the first and second output terminals, the resistive load without a discrete parallel capacitor. The method may further include disconnecting the input signal from the input terminals for a period of time after applying the rectangular wave. The rectangular wave input signal may be non-periodic.

In accordance with another embodiment of the invention, a method of signal processing includes generating at a first component a rectangular wave form. The rectangular wave form is transmitted to an implanted second component via a wired interface between the first component and the second component, the second component including a CMOS bridge rectifier. The rectangular wave form is applied across a first input terminal and a second input terminal of the CMOS bridge rectifier. The CMOS bridge rectifier includes a first output terminal and a second output terminal for providing a rectified power component. A substantially resistive load (with the only output capacitance being, for example, relatively small parasitic capacitances from circuit components and leads) is operatively coupled between the first and second output terminals, the resistive load without a discrete parallel capacitor.

In accordance with related embodiments of the invention, the second component may be implanted in the retina. The second component may include one or more electrodes, the method further including activating the one or more electrodes, wherein activating the one or more electrodes is powered, at least in part, by the rectified power component. The first component may be implanted. The first component may be implanted behind the ear.

In accordance with further related embodiments of the invention, the first and second component may be part of a cochlear implant, wherein the method includes implanting at least one of the first and second components. The second component may include a microphone powered, at least in part, by the rectified power component, the first component including an electrode array for stimulating the acoustic nerve. The rectangular wave form may include a data sequence, wherein data output terminals coupled to the CMOS bridge rectifier provide an output signal representative of the data sequence. The method may further include neural stimulation by the first and/or second components.

In accordance with another embodiment of the invention, a system for signal processing includes a first component for generating and transmitting a rectangular wave form. A second component includes a CMOS bridge rectifier, the second component receiving the rectangular wave form from the first component via a wired interface between the first component and the second component. The CMOS bridge rectifier includes a first input terminal and a second input terminal for receiving the rectangular wave form. The CMOS bridge rectifier further includes a first output terminal and a second output terminal for providing a rectified power component. A substantially resistive load (with the only output capacitance being, for example, relatively small parasitic capacitances from circuit components and leads) is operatively coupled between the first and second output terminals, the resistive load without a discrete parallel capacitor.

In accordance with related embodiment of the inventions, the second component may be adapted for implantation in the retina, the second component including one or more electrodes, wherein the electrodes are activated using, at least in part, the rectified power component. In other embodiments, the first and second components may be adapted to be part of a cochlear implant, the second component including a microphone powered, at least in part, by the rectified power component, the first component including an electrode array for stimulating the acoustic nerve. The rectangular wave form may include a data sequence, wherein data output terminals coupled to the CMOS bridge rectifier provide an output signal representative of the data sequence. The first component may include a first housing, with the second component includes a second housing different from the first housing.

BRIEF DESCRIPTION OF THE DRAWINGS

FIG. 2(A) is a schematic showing a CMOS bridge circuit with a rectangular wave input, in accordance with one embodiment of the invention; FIG. 2(B) shows exemplary input voltage $u_1(t)$; and FIG. 2(C) shows corresponding output voltage $U_2$;

DETAILED DESCRIPTION OF SPECIFIC EMBODIMENTS

Operation of a bridge circuit as described above is typically considered with respect to a sine wave ac input signal such as 110 vac 60 Hz used for appliances in the United States. But the behavior of the circuit is interestingly different when the input signal is some form of a rectangular wave signal. The rectangular wave may be, for example, periodic, and/or a non-periodic signal that may include a data component (i.e., carrying information).

For example, in the general case of a rectangular wave input signal, a CMOS bridge circuit may be used to provide a constant DC voltage without necessarily requiring a discrete smoothing output capacitor and/or additional diodes. The load may be substantially resistive; with the only output capacitance being, for example, relatively small parasitic capacitances from circuit components and leads. Applying a rectangular wave input signal to a CMOS bridge circuit without the need for a discrete smoothing capacitor or diodes may advantageously be used in applications with limited space and weight.

FIG. 2(a) is a schematic showing a CMOS bridge circuit 200 with a rectangular wave input $u_1(t)$ and no output capacitor, in accordance with one embodiment of the invention. The CMOS bridge circuit 200 includes an output voltage $U_2$, and four CMOS switches PMOS1, PMOS2, NMOS1, and NMOS2. The output port is connected to a load R which is substantially resistive. Assuming $u_1(t)$ is equal to ±X volts $u_{THR}$, as shown in FIG. 2(b), then $U_2=|u_1(t)|=X$ volts, a constant DC output voltage $U_2$, as shown in FIG. 2(c).

In illustrative embodiments of the invention, the CMOS bridge circuit may be used, without limitation, in a retinal implant. The central component of the retinal implant is typically an electronic chip located either on the surface of the inner retina (epiretinal approach), or in the subretinal space (subretinal approach). Typically, the size of this chip is some square millimeters, and the thickness is some tens of microns. There is minimal room for additional electrical components, and the entire functionality of the retinal implant has to be integrated on chip. Therefore, for a retinal implant, not having a discrete capacitor is critical.

The chip of the retinal implant may essentially have an array of subunits, where each subunit consists of a photodiode, an analog amplifier and a stimulating electrode. These subunits are designed to convert the light energy from images into electrical impulses to stimulate the remaining functional cells of the retina. Unfortunately, early hopes that such a chip could be powered solely by incident light and not require the use of external power supply did not hold.

Figure 3:
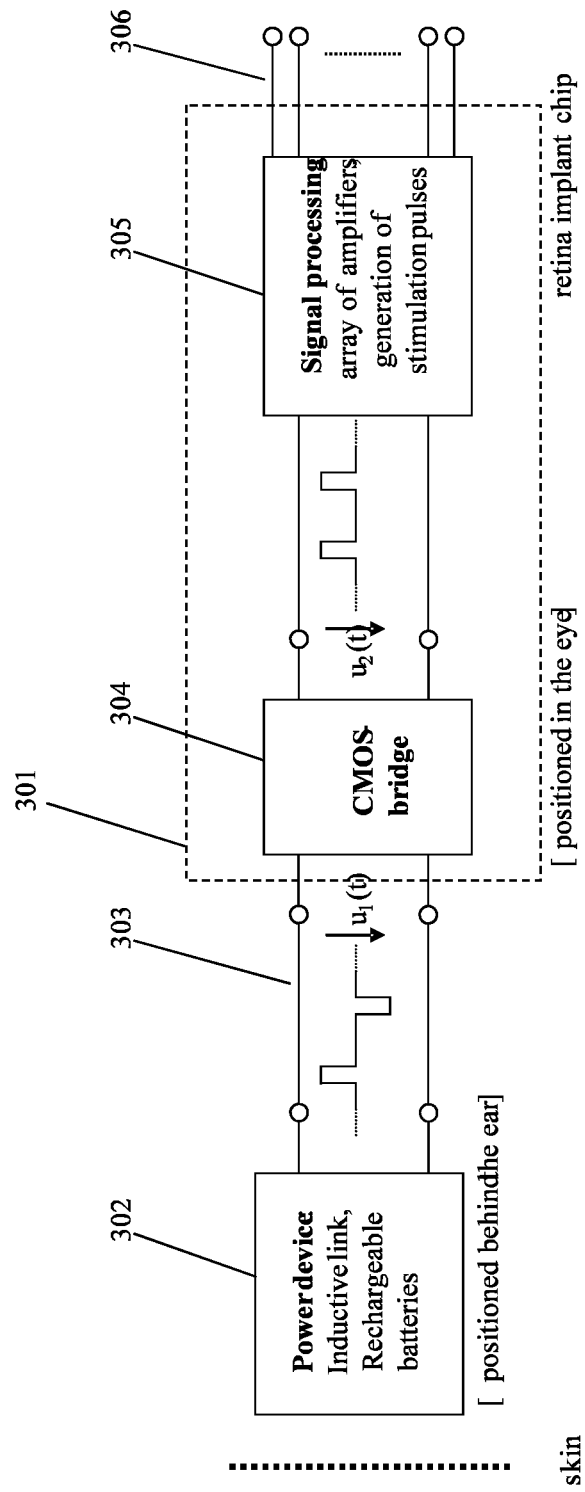
FIG. 3 shows a rectangular wave input signal having active and floating periods, in accordance with one embodiment of the invention.

FIG. 3 shows a retinal chip 301 connected to a second device 302 providing power- and control signals, in accordance with one embodiment of the invention. The connection between the retinal chip 301 and the second device is established by wire (unlike Rf-based transmission systems that deal with sinusoidal waves). For example, the second device 302 may be implanted in the area behind the ear (similar to a cochlear implant), and include rechargeable batteries, which in turn can be recharged—if required—transcutaneously using an inductive link. The electrode array 306 provides stimulation patterns to elicit optical impressions in the brain. Wires 303 connecting the retinal chip 301 and device 302 may have a length of some centimeters.

A direct supply of the retinal chip with dc-voltage should be avoided, because wires 303 with dc-voltage potentials in aggressive body fluids are problematic for a variety of reasons. For example, although the wires are isolated against each other, a permanent electrical field between wires may cause material migration and lead to the growth of low impedance bridges (dentrites). Another problem might occur, if the isolation between two wires is defect for some reason. Then the dc-potential between wires might cause electrolysis and possibly can destroy nerve tissue.

Figure 4:
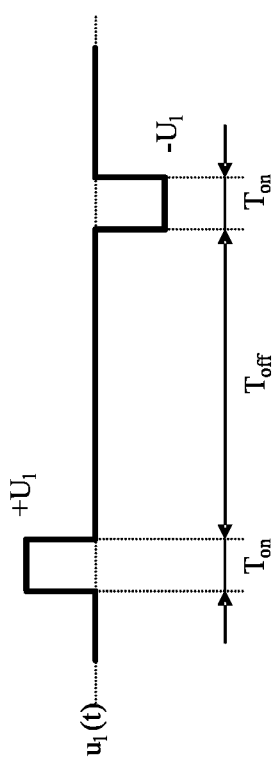
FIG. 4 is a schematic showing a power supply system for a retinal implant, in accordance with one embodiment of the invention.

DC-potentials in the power supply wires 303 are avoided, if device 302 generates pulsed waveforms as shown in FIG. 4. In FIG. 4, voltage $u_1(t)$ is composed of segments with constant positive and negative levels $+U_1$ and $-U_1$ of durations $T_{on}$, respectively, and voltage $u_1(t)=0$ for periods $T_{off}$. It is assumed that the retinal chip 301 is activated during $T_{on}$, and deactivated during $T_{off}$. Typically, the activation rate could be about 20 Hz, according to the requirements of the human optical systems. For such a pulsed input voltage, the CMOS-bridge 304 generates a rectified version of the input voltage, i.e., the output voltage is $u_2(t)\sim+U_1$ during $T_{on}$, and $u_2(t)=0$ during $T_{off}$. Thus $u_2(t)$ can serve as a pulsed supply voltage for the signal processing portion of retinal chip 301. Alternatively, if a continuous rectangular wave is input, $u_2(t)$ can serve as a continuous DC supply voltage.

Both the CMOS bridge circuit 304 and its load may advantageously be integrated on single chip. For example, the bridge circuit 304 may be functionally coupled with other circuitry such as a signal processor 305, and both the bridge circuit 304 and the signal processing circuitry 305 can be integrated onto a single chip.

The CMOS bridge circuit may also be used, without limitation, in a microphone subsystem within a cochlear implant. For example, in a totally implantable cochlear implant, the microphone typically is positioned outside the main device, with power provided by the main device to the microphone via two wires. As with the retinal implant, size and weight constraints apply and there is minimal space for any additional circuit components. A direct supply of DC voltage to the microphone is potentially dangerous to surrounding tissue, as described above with reference to the retinal implant. A rectangular wave input in combination with the CMOS bridge circuit is therefore ideal.

Figure 1:
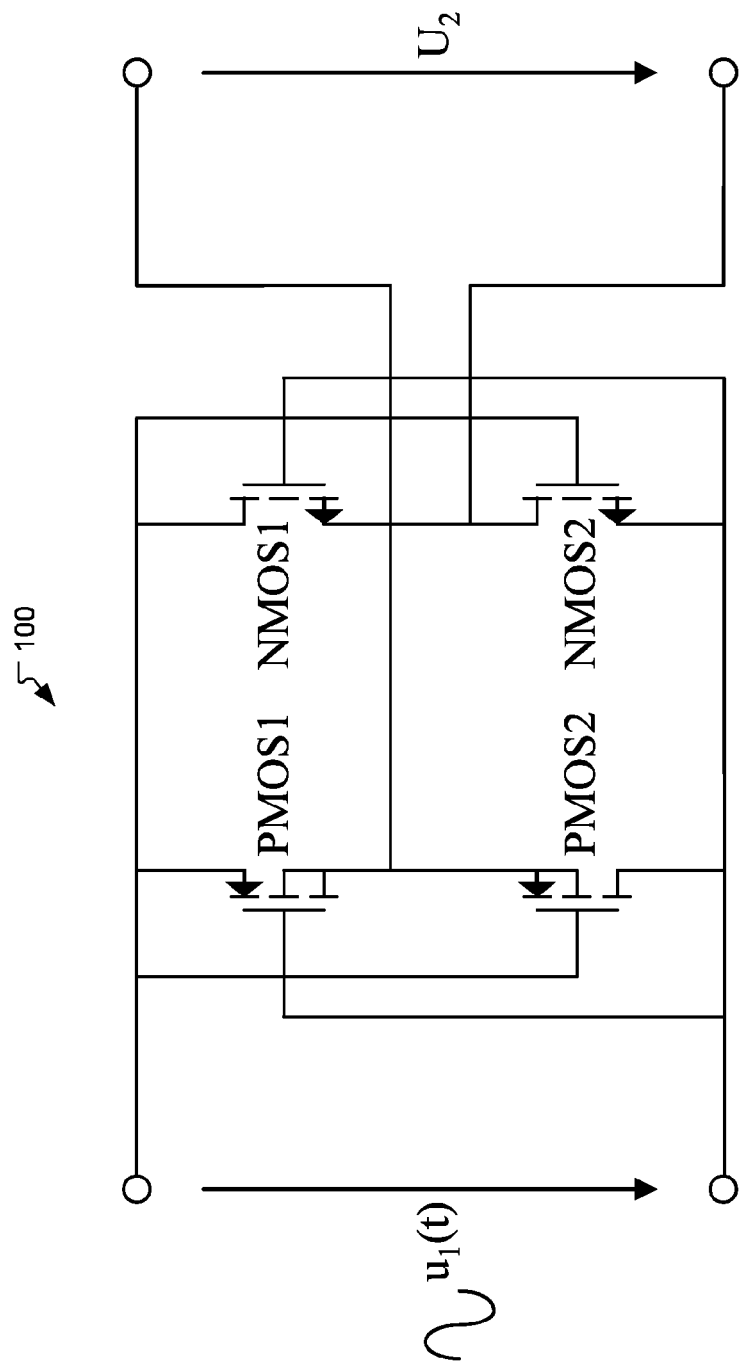
FIG. 1 is a schematic showing a CMOS bridge circuit with sinusoidal input (Prior Art)
Figure 5:
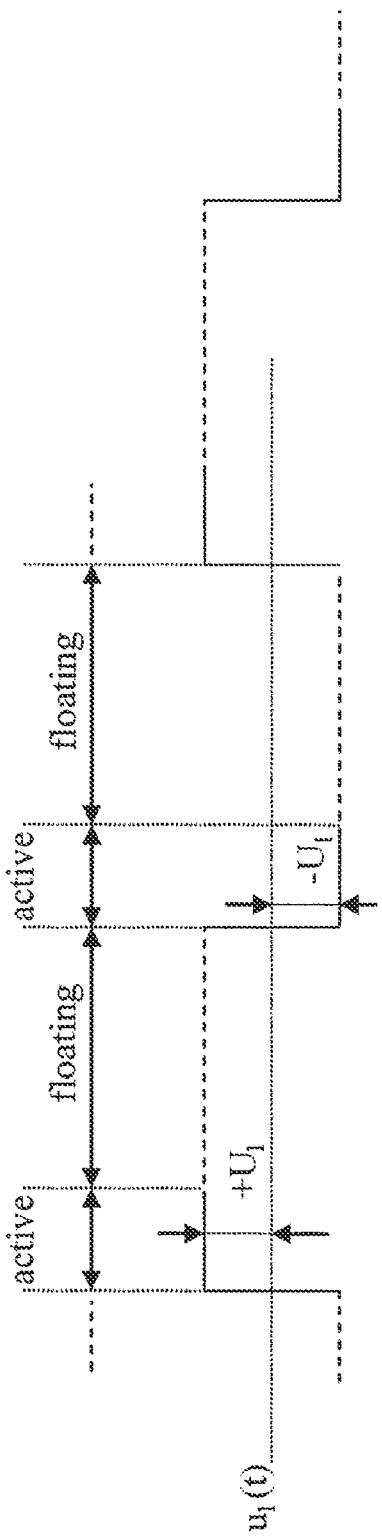
FIG. 5 shows a pulsed input signal that may be used in the embodiment shown in FIG. 4, in accordance with one embodiment of the invention.

When the input terminals have a high impedance across them (e.g., as in the case where they are unconnected), the CMOS bridge circuit also possesses the interesting property of remaining stable in its existing logic state. For example, as shown in FIG. 5, assume that a +5 vdc input is applied to the input terminals of the bridge circuit in FIG. 1 during the time period on the left of FIG. 2 labeled as "active." Then, the same +5 vdc will be passed to the output terminals across the load resistor and optionally, any output capacitor. Assuming that the input signal is then disconnected from the input terminals, PMOS1 and NMOS2 will remain in a low impedance state (and assuming an RC time constant of the load resistor and any output capacitor are sufficiently large) the output voltage will continue to float at +5 vdc due to the output capacitor. A similar action occurs oppositely on the right side of FIG. 5 during the second active and floating periods. This may exploited in some situations such as low power applications when it may be possible to apply the input signal for relatively short active periods and let the circuit float during succeeding inactive periods. Such a signal having active and floating periods need not necessarily be periodic, but in some applications may be non-periodic signal such as an input signal having a data component.

Figure 6:
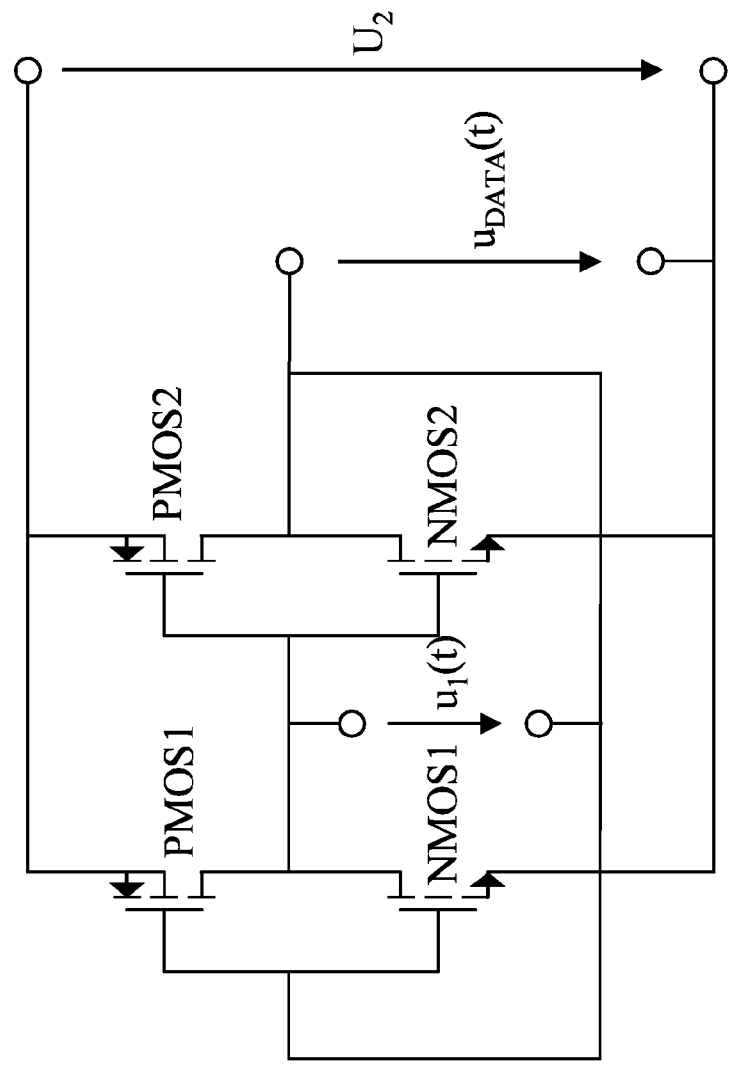
FIG. 6 is a schematic showing a CMOS bridge circuit driven providing both a power component and a data component, in accordance to one embodiment of the invention.

Further illustrative embodiments of the present invention drive a CMOS bridge circuit with a rectangular input signal so as to provide both a power component and a data component, in accordance to one embodiment of the invention. For example, as shown in FIG. 6, a continuous rectangular driving signal $u_1(t)$ may be applied to the CMOS bridge circuit to provide a constant power component $U_2$, similar to above described embodiments. In addition, a rectangular signal $u_{DATA}(t)$ output is coupled, without limitation, to one of the input terminals of the CMOS bridge circuit, and one of the $U_2$ output terminals of the CMOS bridge circuit, to derive a data component. Note that both $U_2$ and $u_{DATA}(t)$ are referenced to the same common reference potential.

Figure 7:
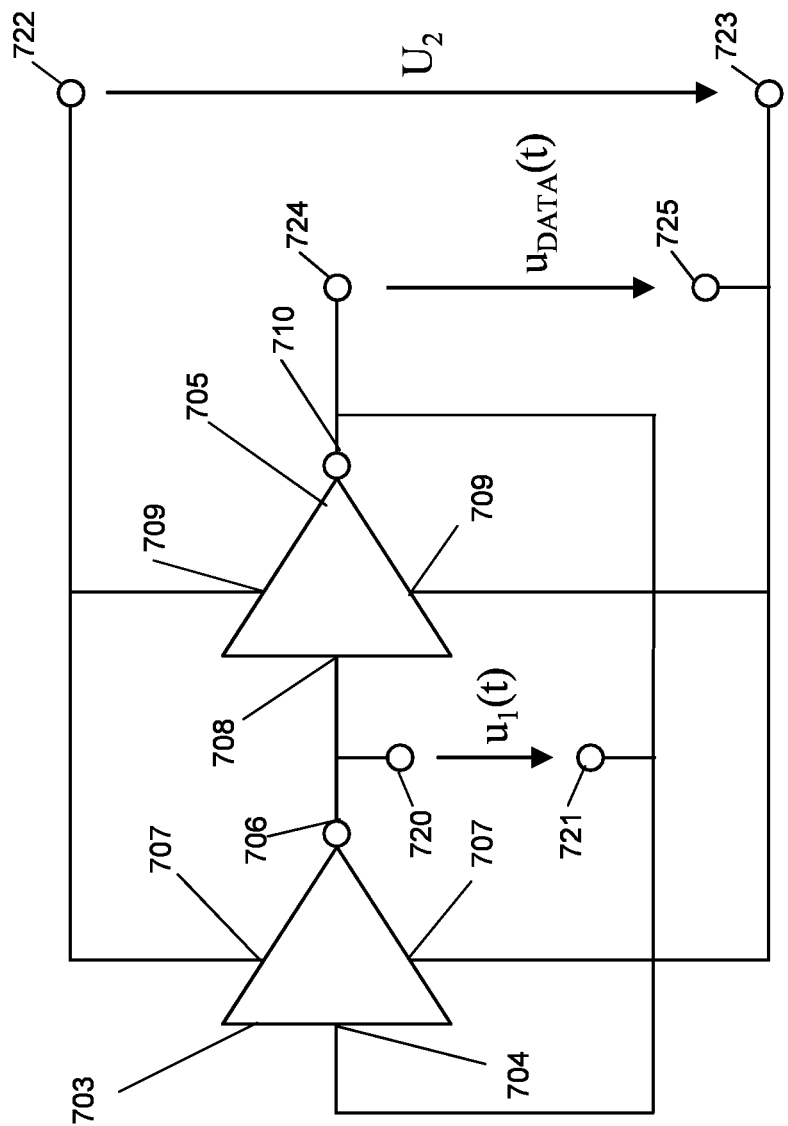
FIG. 7 is a schematic showing a bridge circuit implemented by two inverters that provides both a power component and a data component, in accordance to one embodiment of the invention.

FIG. 7 is similar to the circuit shown in FIG. 6, implemented with two inverter circuits, in accordance with one embodiment of the invention. More particularly, the signal processing circuit includes an input inverter 703 and an output inverter 705. Each inverter 703 and 705 includes a signal input 704 and 708, respectively, for receiving an input (e.g., a rectangular wave), and a signal output 706 and 710, respectively, for providing an output (e.g., an inverted rectangular wave). Each inverter 703 and 705 also includes a pair of voltage outputs 707 and 709 for developing a rectified DC output voltage. A first circuit input terminal 720 is connected to the output 706 of the input inverter 703 and the input 708 of the output inverter 705. A second circuit input terminal 721 is connected to the input 704 of the input inverter 703 and the output 710 of the output inverter 705, wherein the signal input terminals receive an input signal having a data component. A pair of supply voltage output terminals 722 and 723 are connected to the voltage output terminals 707 and 709 of the inverters 703 and 705 for providing a rectified dc supply voltage on output signal $U_2$. A first circuit output terminal 725 is connected to one of the supply voltage output terminals 707 and 709. A second circuit output terminal 724 is connected to the second circuit input terminal 721. The circuit output terminals 724 and 725 provide an output signal $u_{DATA}(t)$ including the data component.

Figure 8A:
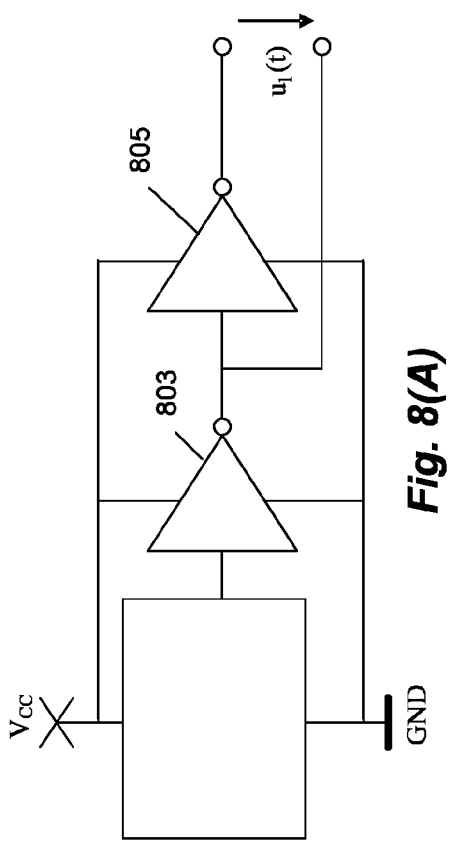
FIGS. 8A and 8B are schematics showing a transmission system, in accordance with one specific embodiment.
Figure 8B:
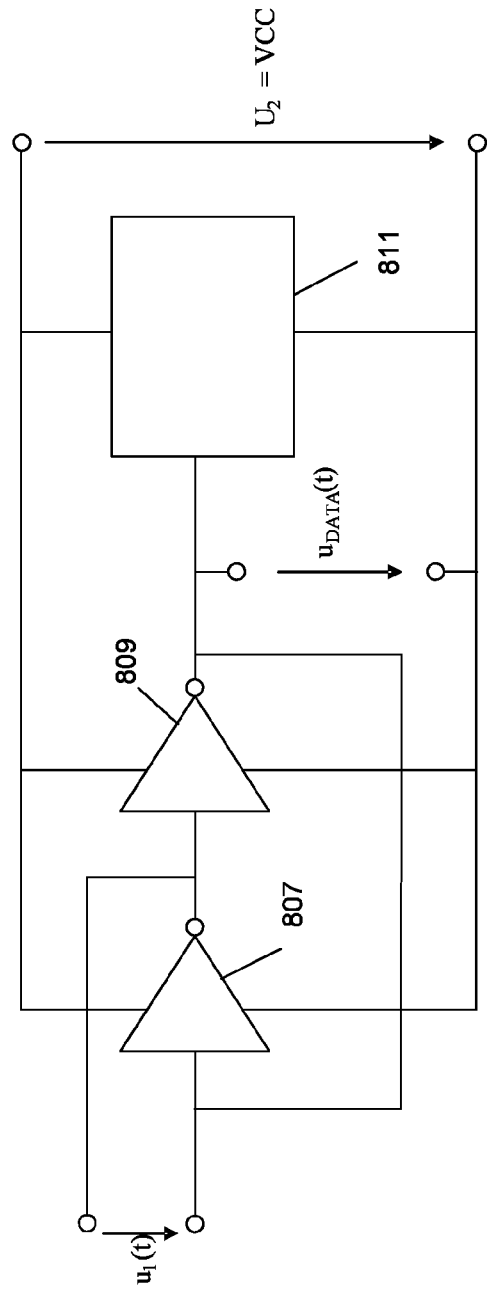

FIGS. 8A and 8B are schematics showing a transmission system, in accordance with one specific embodiment. The primary system shown in FIG. 8(a) includes a signal generator 801 that generates the rectangular signal $u_1(t)$ from a data sequence by using, without limitation, two inverters 803 and 805. The rectangular system transmits the rectangular signal $u_1(t)$ to a secondary system, shown in FIG. 8(b). In various embodiments, the rectangular signal $u_1(t)$ is transmitted, without limitation, via a wired interface between the primary system and the secondary system.

The secondary system includes a CMOS bridge rectifier for deriving the power supply voltage $U_2$ and the data signal $u_{DATA}(t)$. The CMOS bridge rectifier may use, without limitation, two inverters 807 and 809, similar to the embodiment of FIG. 7. The data signal $u_{DATA}(t)$ may be used for further signal detection and processing 811. The CMOS bridge rectifier advantageously may be coupled to a substantially resistive load that does not include a discrete parallel capacitor. As a special feature of the system: if $u_1(t)$ changes from a particular defined state to a floating state, e.g., by disconnecting the lines of $u_1(t)$ from any defined potential, then $u_{DATA}(t)$ remains in a stable the state, as described above in connection with FIG. 5.

The first and secondary systems shown in FIGS. 8A and 8B may be used to form a multi-component implant that is particularly advantageous when a particular component of the implant has limited space. For example, as described above the first component of a retinal implant may act as a primary system and provide rectangular signal $u_1(t)$. The first component may be located, without limitation, behind the ear, so that power can be transmitted transcutaneously using an inductive link. The second component of the retinal implant may then act as the secondary system that receives the rectangular signal $u_1(t)$ and uses a CMOS bridge rectifier to derive power and activate one or more electrodes. In other embodiments, the first and second components may be re adapted to be part of a cochlear implant, the second component including a microphone powered, at least in part, by the rectified power component, the first component including an electrode array for stimulating the acoustic nerve.

The signal processing circuit in the above-described embodiments may advantageously be used in a wide variety of applications. For example, it may be used to provide a desired supply voltage polarity and data component signals in diverse fields such as, without limitation, the automotive or medical fields. Embodiments may also include using such a circuit as the basis for a polarity protection data circuit which allows for arbitrary connecting of the inputs to a dc source, independently of the polarity.

In various embodiments, the disclosed method may be implemented as a computer program product for use with a computer system. Such implementation may include a series of computer instructions fixed either on a tangible medium, such as a computer readable media (e.g., a diskette, CD-ROM, ROM, or fixed disk) or transmittable to a computer system, via a modem or other interface device, such as a communications adapter connected to a network over a medium. Medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable media with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

What is claimed is:

1. A signal processing circuit comprising:
a CMOS bridge rectifier circuit including:
a first input terminal and a second input terminal for receiving a rectangular wave form that includes a data sequence;
a first output terminal and a second output terminal for providing a rectified dc output voltage; and
a first data output terminal connected to one of the first and the second input terminals, and a second data output terminal connected to one of the first and the second output terminals, wherein the data output terminals provide an output signal representative of the data sequence.

2. The signal processing circuit according to claim 1, further comprising a substantially resistive load operatively coupled between the first and second voltage output terminals, the resistive load without a discrete parallel capacitor.

3. The signal processing circuit according to claim 1, wherein the signal processing circuit is integrated on a single chip.

4. An implanted medical device comprising the signal processing circuit of claim 1.

5. An implanted medical device according to claim 4, wherein the medical device is a retinal implant.

6. An implanted medical device according to claim 4, wherein the medical device is a cochlear implant.

7. A chip comprising:
the signal processing circuit according to claim 1; and
a substantially resistive load coupled between the first and second output terminals without a discrete parallel capacitor.

8. The chip according to claim 7, wherein the load includes a signal processor.

9. The signal processing circuit according to claim 1, wherein the CMOS bridge rectifier circuit includes four switches.

10. The signal processing circuit according to claim 9, wherein the four switches are MOS transistors.

11. The signal processing circuit according to claim 1, wherein the CMOS bridge rectifier circuit includes two inverters.

12. The signal processing circuit according to claim 1, wherein the CMOS bridge rectifier includes two PMOS transistors and two NMOS transistors.

13. A method of providing data and power in a medical implant, the method comprising:
applying a rectangular wave input signal between a first input terminal and a second input terminal, a first switch coupled between the first input terminal and a first node, a second switch coupled between the second input terminal and the first node, the first node coupled to a first output terminal, a third switch coupled between the first input terminal and a second node, a fourth switch coupled between the second input terminal and the second node; the second node coupled to a second output terminal, a third output terminal coupled to the second input terminal, and a fourth output terminal coupled to the second node;
wherein the first switch and fourth switch are gated on when the input signal is of a first polarity; and wherein the second switch and the third switch are gated on when the input signal is of a second polarity opposite the first polarity so that the first and second output terminals provide a dc voltage, and the third and fourth output terminals provide a data component.

14. The method of claim 13, wherein the medical implant is one of a cochlear implant and a retinal implant.

15. The method according to claim 13, wherein the first switch, the second switch, the third switch, and the fourth switch are MOS transistors.

16. The method according to claim 13, further comprising:
disconnecting the input signal from the input terminals for a period of time after the switches are gated on.

17. The method according to claim 13, wherein the rectangular wave input signal is non-periodic.

18. A method of providing data and power in a medical implant, the method comprising:
applying a rectangular wave form that includes a data sequence across a first input terminal and a second input terminal of a CMOS bridge rectifier, the CMOS bridge rectifier including a first output terminal and a second output terminal for providing a rectified dc output voltage, wherein a first data output terminal connected to one of the first and the second input terminals, and a second data output terminal connected to one of the first and the second output terminals, the data output terminals providing an output signal representative of the data sequence.

19. The method according to claim 18, wherein the CMOS bridge rectifier includes two inverters.

20. The method of claim 18, wherein the medical implant is one of a cochlear implant and a retinal implant.

21. The method according to claim 18, further comprising:
disconnecting the input signal from the input terminals for a period of time after applying the rectangular wave.

22. The method according to claim 18, wherein the rectangular wave input signal is non-periodic.

23. The method according to claim 18, wherein the CMOS bridge rectifier circuit includes four switches.

24. The method according to claim 23, wherein the four switches are MOS transistors.

25. The method according to claim 18, wherein the CMOS bridge rectifier includes two PMOS transistors and two NMOS transistors.

* * * * *